Sept. 7, 1943.  A. BECHLER  2,328,602
DEVICE FOR THE AXIAL COUPLING OF TWO CYLINDRICAL
PARTS BY MEANS OF THREADS
Filed Dec. 13, 1940
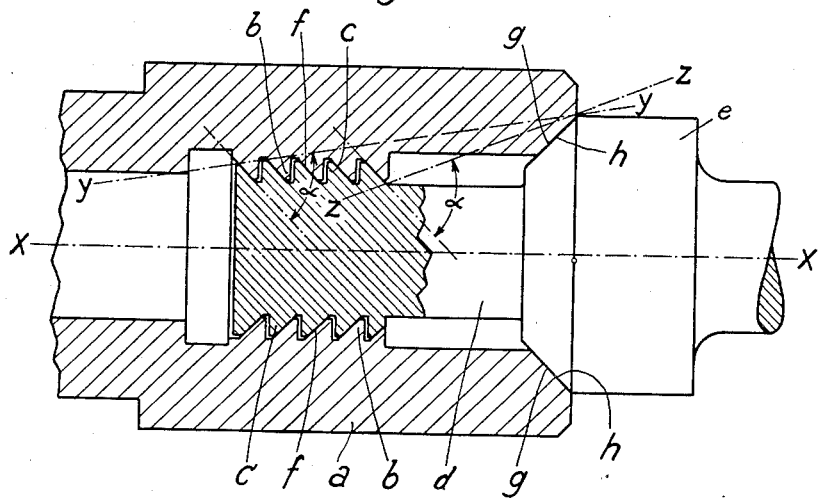
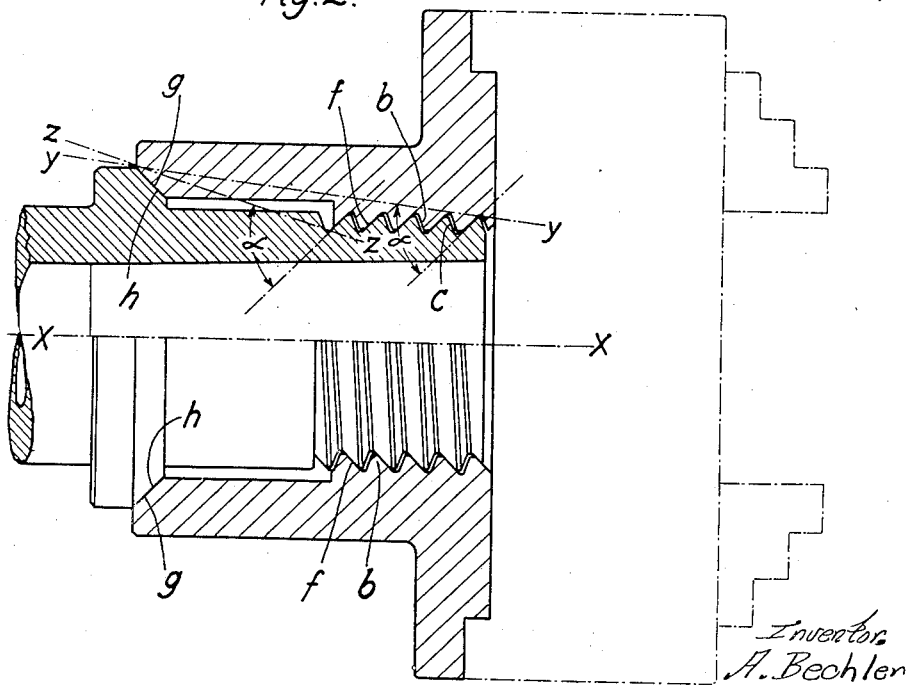

Patented Sept. 7, 1943

2,328,602

UNITED STATES PATENT OFFICE 2,328,602

DEVICE FOR THE AXIAL COUPLING OF TWO CYLINDRICAL PARTS BY MEANS OF THREADS

André Bechler, Moutier, Switzerland

Application December 13, 1940, Serial No. 370,081
In Switzerland December 30, 1939

4 Claims. (Cl. 287—125)

The present invention relates to a device for the axial coupling of two cylindrical parts by means of threads.

It is well known to those skilled in the art that it is impossible to fix a driver or a tool to a machine shaft by means of threads in such a way that it always runs true, i. e. after each repeated re-mounting. In spite of all conceivable precautions and in spite of the accuracy with which the manufacture of the threads engaging one another is carried out (polishing, grinding, etc.), it happens that the axis of the fixed tool forms a small angle with the axis of the machine, which fact causes the greater bobbling the further the observed tool lies from the shaft end of the machine.

A driver or a tool with a thread can seldom be fixed without a slight deviation of the part carrying the thread, said deviation being caused by the weight of this part and, on tightening, maintained or even augmented. This deviation of the tool cannot be prevented by the provision of a conical guide at one end of the machine shaft for it is generally a question of a deviation in the order of hundredths or millimetres, deviations which, in modern machines are inadmissible. In another sphere where two round bars are to be coupled exactly and where the end of one bar is screwed to the end of the other, it is also well known that an exact coupling is impossible. Sometimes exactness may be obtained, but seldom more than twice with the same pieces.

The object of the present invention is a device for axially coupling two cylindrical parts by means of threads, e. g., for fastening a tool to the end of the shaft of a machine tool, which tool is provided with a cone making contact with a corresponding cone at the end of the shaft.

This device is characterized in that all the thread flanks turned toward the cone, and a line which lies in a plane going through the common axis of the parts to be coupled and which connects the great base of the cone with any point of these flanks, form an angle which is smaller than the complement of the angle of friction of the building material or materials used. For steel and, generally, for iron-like metals, this angle is, therefore, less than 81.5°. If these conditions are fulfilled, the flanks of the threads cooperate with one another like two cones, one of which glides on the other. Screwing-on results in a very exact centration without the necessity of taking extreme care about the mutual dimensions of the threads. Therefore, the device may have play without impairing the accuracy of centration.

The accompanying drawing illustrates, as an example, two embodiments of the device according to the invention, which embodiments are both used in the head stock of a lathe.

Fig. 1 is a central section of the first embodiment and

Fig. 2 is a central section of the second embodiment.

In the device according to Fig. 1 $a$ is the end of the shaft of a machine tool, e. g., of a lathe or a milling machine. This shaft is provided with a female thread $b$ cooperating with a male thread $c$ on the pin $d$ of a driver $e$ which is to be fixed to the shaft of the lathe. The flanks $f$, which, on tightening, are pressed against one another, have such an inclination relative to the axis $x$—$x$ of the head stock of the lathe, that a line $y$—$y$ or $z$—$z$, or any other line lying between these two lines and in a plane through the axis of rotation $x$—$x$, and connecting the great base line of the cones $g$, $h$ with any point of the flanks of the thread, forms, together with these flanks an angle $\alpha$ which is less than 81.5°, i. e., less than the complement of the angle of friction of the metals used (steel). In this way these flanks of thread slide on one another until the portions to be joined together are exactly centered whatever the initial deviation of the portion to be fixed to the other may be.

Fig. 2 illustrates a chuck with four jaws which is attached to the shaft end of a lathe by means of threads. The shaft end has a male thread $c$ and the driver of the chuck a female thread $b$. The flanks $f$ of the threads which cooperate on tightening fulfil the same conditions as mentioned above. The lines $y$—$y$ and $z$—$z$ illustrating the two limit positions, form an angle $\alpha$ together with the flanks which is less than the complement of the angle of friction of the metals used.

Here too and for the same reasons as mentioned above the driver with the chuck adjusts itself automatically as soon as the conical, concentric surfaces $g$ and $h$ come into contact with each other.

It is understood that with the described arrangement of the threaded flanks the same result as mentioned above may be obtained in case of the axial coupling of two shafts.

What I claim is:

1. In a device, a hollow part, an unslitted part, threads on the end of said unslitted part, other threads on said hollow part adapted to engage said threads on said unslitted part, a cone on said unslitted part with a great base turned away from said threads, another cone provided on said hollow part with a great base turned away from said other threads and adapted to engage said first mentioned cone, that thread of said threads and said other threads lying next said cone including a flank turned towards said cone, said flank extended inwardly toward the center of said unslitted part and an imaginary line lying in an imaginary plane through the common axis of said hollow part and said unslitted part and connecting the great base of said cone with the root of said flank, forming an angle which is less than the complement of the angle of friction of the building material used.

2. In a device, a hollow part, an unslitted part, threads on the end of said unslitted part, other threads on said hollow part, a cone on said unslitted part with a great base turned away from said threads, another cone provided on said hollow part with a great base turned away from said other threads and adapted to engage said first mentioned cone, that thread of said threads and said other threads lying next said cone including a flank turned towards said cone, said flank extended inwardly toward the center of said unslitted part and an imaginary line lying in an imaginary plane through the common axis of said hollow part and said unslitted part and connecting the great base of said cone with the root of said flank, forming an angle which is less than 81.5°.

3. In a device, a hollow part, an unslitted part, threads on the end of said unslitted part, other threads on said hollow part adapted to engage said threads on said unslitted part, said threads and said other threads having unsymmetrical cross sections, a cone on said unslitted part with a great base turned away from said threads, another cone provided on said hollow part with a great base turned away from said other threads and adapted to engage said first mentioned cone, that thread of said threads and said other threads lying next said cone including a flank turned towards said cone, said flank extended inwardly toward the center of said unslitted part and an imaginary line lying in an imaginary plane through the common axis of said hollow part and said unslitted part and connecting the great base of said cone with the root of said flank, forming an angle which is less than the complement of the angle of friction of the building material used.

4. In a device, a hollow part, an unslitted part, threads on the end of said unslitted part, other threads on said hollow part adapted to engage said threads on said unslitted part, said threads and said other threads having unsymmetrical cross sections, a cone on said unslitted part with a great base turned away from said threads, another cone provided on said hollow part with a great base turned away from said other threads and adapted to engage said first mentioned cone, that thread of said threads and said other threads lying next said cone including a flank extended inwardly toward the center of said unslitted part turned towards said cone, said flank and an imaginary line lying in an imaginary plane through the common axis of said hollow part and said unslitted part and connecting the great base of said cone with the root of said flank, forming an angle which is less than 81.5°.

ANDRÉ BECHLER.